(12) United States Patent
Lo

(10) Patent No.: US 11,347,421 B2
(45) Date of Patent: May 31, 2022

(54) NODE DEVICE FOR STORAGE AREA NETWORK AND METHOD FOR MAINTAINING DATA CONSISTENCY

(71) Applicant: GUANGZHOU FEIXI TECHNOLOGY CO., LTD, Guangzhou (CN)

(72) Inventor: Horatio Lo, Guangzhou (CN)

(73) Assignee: GUANGZHOU FEIXI TECHNOLOGY CO., LTD, Guangzhou (CN)

(*) Notice: Subject to any disclaimer, the term of this patent is extended or adjusted under 35 U.S.C. 154(b) by 26 days.

(21) Appl. No.: 17/109,326

(22) Filed: Dec. 2, 2020

(65) Prior Publication Data
US 2021/0165570 A1    Jun. 3, 2021

(30) Foreign Application Priority Data
Dec. 2, 2019  (TW) .................................. 108216043

(51) Int. Cl.
*G06F 3/00*    (2006.01)
*G06F 3/06*    (2006.01)
*G06F 9/4401*    (2018.01)
*G06F 11/30*    (2006.01)

(52) U.S. Cl.
CPC .......... *G06F 3/064* (2013.01); *G06F 3/0604* (2013.01); *G06F 3/067* (2013.01); *G06F 3/0622* (2013.01); *G06F 3/0629* (2013.01); *G06F 3/0659* (2013.01); *G06F 3/0689* (2013.01); *G06F 9/4406* (2013.01); *G06F 9/4411* (2013.01); *G06F 11/3034* (2013.01); *G06F 11/3058* (2013.01)

(58) Field of Classification Search
None
See application file for complete search history.

(56) References Cited

U.S. PATENT DOCUMENTS

2018/0101316 A1\* 4/2018 Bordoli ................... G06F 3/065

\* cited by examiner

*Primary Examiner* — Midys Rojas
(74) *Attorney, Agent, or Firm* — Volpe Koenig

(57) ABSTRACT

A first node is configured to connect a second node to form a node group, wherein the first node and the second node have a first datum and a second datum respectively, the first datum has the same content as the second datum, and the first node includes a storage device and a server. The server is configured to electrically connect the storage device and has a processor including a Linux program arbiter communicating with the second node, wherein the Linux program arbiter includes a permitting unit and a write-protection unit. The permitting unit is configured to allow a first request when receiving the first request for overwriting the first datum, and the write-protection unit is configured to prevent the second node from overwriting the second datum before the first datum is overwritten by a third datum and the second node replaces the second datum with the third datum.

20 Claims, 11 Drawing Sheets

S10

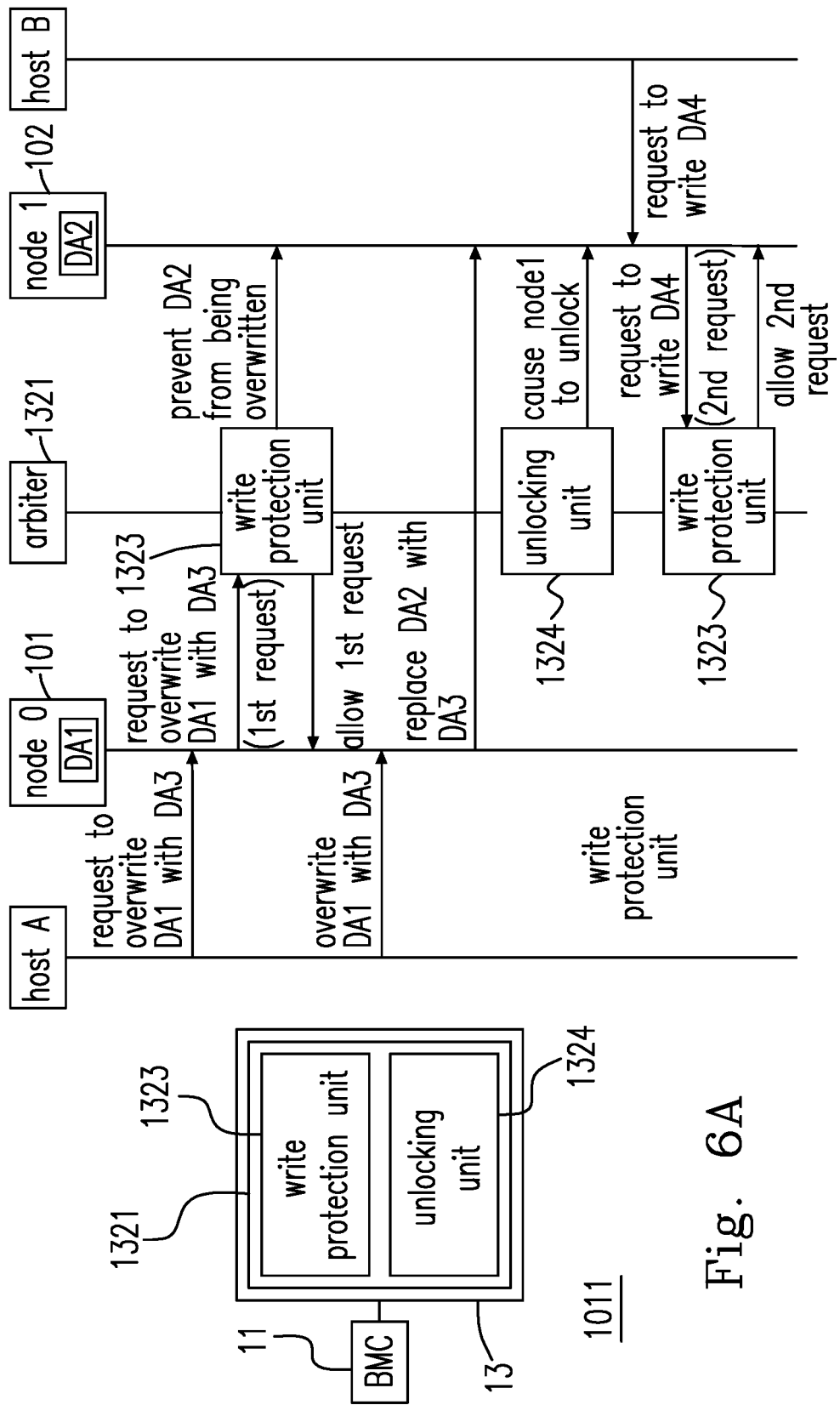

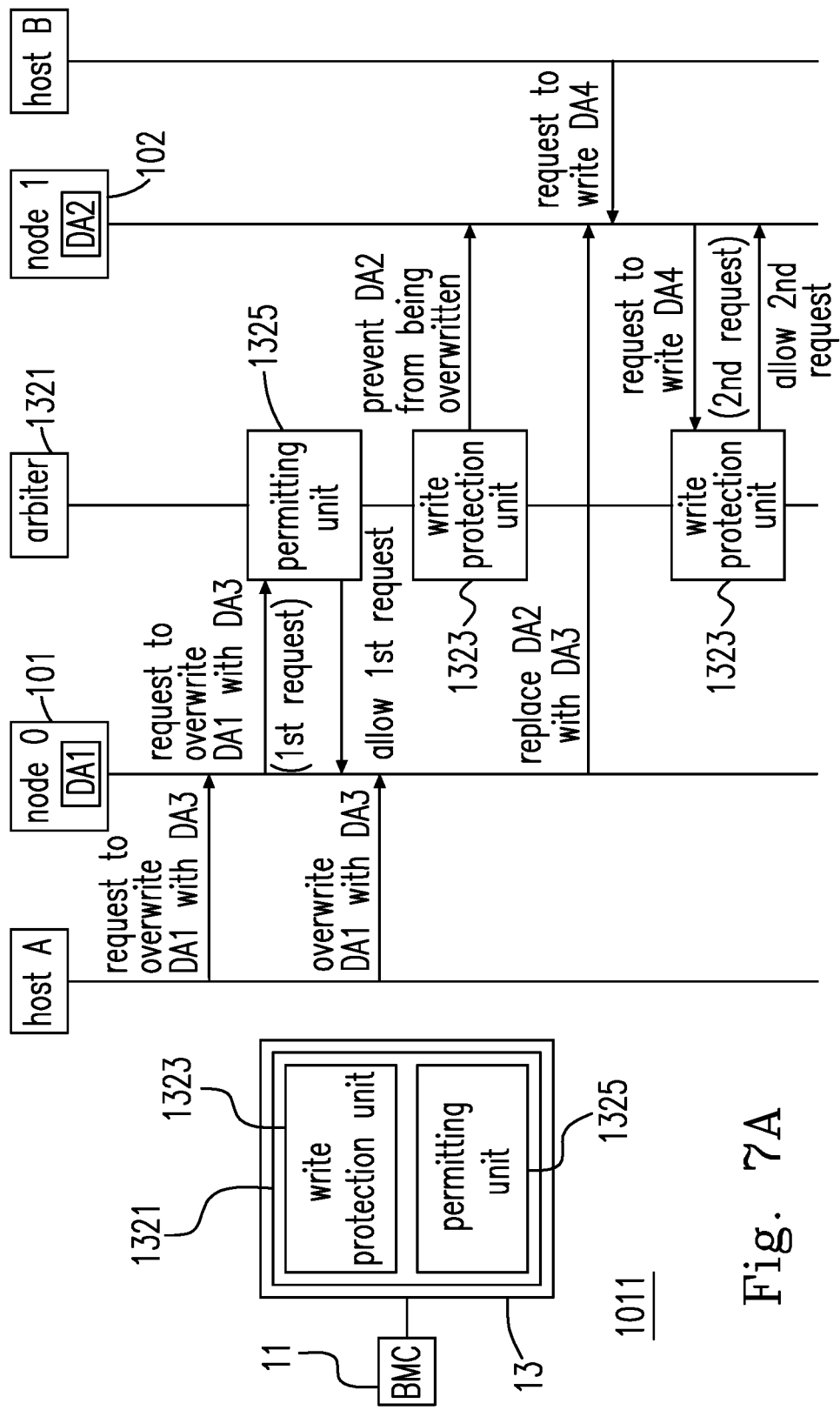

NODE DEVICE FOR STORAGE AREA NETWORK AND METHOD FOR MAINTAINING DATA CONSISTENCY

CROSS REFERENCE TO RELATED APPLICATION

This application claims the benefit of Taiwan's Patent Application No. 108216043, filed on Dec. 2, 2019, at Taiwan's Intellectual Property Office, the disclosures of which are incorporated herein in their entirety by reference.

TECHNICAL FIELD

Embodiments of the present disclosure are related to a node device for a storage area network and a method for maintaining data consistency, and more particularly to a node device using an arbiter constructed with an open source operating system, and a method for maintaining data consistency by using the arbiter.

BACKGROUND

In the structure of a general Storage Area Network (SAN), storage nodes at different locations form a node cluster, and data can be replicated (or mirrored) among the storage nodes. Data replication can be performed as soon as data is written into the disk array of some storage node. Alternatively, data can be firstly stored into a cache, and then is synchronized later. By sending a write request towards a storage node, the data can be written to the storage node. The request to write data is issued by the initiator. The initiator can be another node, a computer, an application on the computer, or a user of the computer. When data is written to the storage node, the storage node can be called a master node. The master node can then mirror the data to one or more other nodes, which can be called secondary (or auxiliary) nodes.

However, the data between mirror nodes must be consistent because all data written at each corresponding data block in each mirror node may not be immediate or automatic. Data inconsistencies may occur due to any number of a variety of conditions, which includes the following: there are bad disk tracks, the storage node is down for some reason, the network is blocked, the network is disconnected, and so on. When the master node cannot communicate with the auxiliary node through the network, it may be just a network problem, and the auxiliary node is still operating. At this time, the auxiliary node will consider itself as the master node, and write data on both sides, causing a problem of inconsistent data on both sides.

In addition, in high-end servers used in SANs, optical fibers are often used to transmit data and back up mirrored data. The processors in the servers are also high-end processors. Using these components is expensive, and only by purchasing at more expensive licenses, the operating systems are available for the users.

Therefore, it is expected to propose a server structure and an open source operating system that is embedded with specific drivers and applications, so as to reduce costs, achieve the performance of high-end servers, and solve the problem of data inconsistency.

SUMMARY OF INVENTION

The present disclosure proposes a first node device for a storage area network (SAN). The first node device is connected to a second node device to form a node device group. Each node device includes a SAN server and a storage device, such as a disk array. The SAN server includes a processing module and an independently operable monitoring module. For example, the processing module is a motherboard and the independently operable monitoring module is a baseboard management controller (BMC). The independently operable monitoring module can monitor hardware parameters such as the temperature of the motherboard, the fan speed and the communication between BMCs of other nodes, and can relatively easily monitor and manage the node device group, such as turning the SAN server on, turning the SAN server off, restarting the SAN server, etc. However, the more complicated management is left to the motherboard and the operating system. For example, it is determined which node device is the master node device; the data of the first node device is synchronized to that of the second node device; or the data of the second node device is synchronized to that of the first node device. The present disclosure provides a mechanism to avoid the problem of inconsistency when data is written to a certain node. The BMC can also be integrated into the motherboard, or the two can be separated but electrically connected, and the BMC can monitor the motherboard through a transmission protocol between the chips.

This mechanism is achieved particularly through self-developing applications and drivers built on open source operating systems, such as operating systems with Linux open source codes, which include Ubuntu or CentOS operating systems used by relatively high stability servers. The Linux application or driver can be used as a (Linux) arbiter to reserve a Logic Unit Number (LUN) for newly added node devices to avoid conflicts when joining at the same time. The arbiter may also determine one of the first node device or the second node device as the master node device according to the node number or the LUNs that have joined the node device group. For example, selecting the lowest node number as the master node device in the cluster.

The present disclosure provides a Linux driver or Linux application, which is based on an open-source Linux operating system running on a processor for a low-cost, low-power, high-performance mobile device, such as an ARM processor, and at least one of the newly developed Linux driver and Linux applications can be used as the arbiter, which can determine which node device is the master node device. For example, the node device which joins a node device group firstly can select itself as the master node device. Alternatively, the node device having the smallest node number or LUN is to be the master node device.

The motherboard in the present disclosure provides a plurality of electrical network connection ports, which can perform data backup (replication) between node devices in different locations, and can be used to replace high-cost fiber network connection ports and achieve the same or even better network transmission performance. One of the plurality of electrical network ports can be connected to a separate network domain for use as a monitoring node device. When the node device is offline or closed, the electrical network port connected to the independent network domain can be used to know this situation, and the arbiter takes proper control of the node device, such as restart or shutdown, to avoid data inconsistency.

A plurality of PCI express (PCIe) interface units are provided on the motherboard in the present disclosure. The SAN server in each node device can be electrically connected to the disk array through the PCIe data bus. The mechanical-type hard drives of the disk array can be replaced with solid-state hard drives to speed up data access. The data access can be data block level access, file level access, and object level access. The PCIe bus slot can also be inserted with a network card to expand the network port. The motherboard in the present disclosure also includes a plurality of random access memories (RAMs), which can temporarily store a plurality of data. A plurality of data of a disk array (RAID) between mirror nodes is overwritten, or when a LUN mapping database of a node device group is changed, synchronizations do not need to go into action immediately, the plurality of data can be stored into RAMs first for later synchronizations.

In accordance with one embodiment of the present disclosure, A first node device for a Storage Area Network (SAN) is provided, wherein the first node device is connected to a second node device to form a node device group, the first and the second node devices have a first datum and a second datum respectively, and the first and the second data have the same content, and the first node device comprises an SAN server and a disk array. The SAN server includes a first Baseboard Management Controller (first BMC), and a processing module including a Linux program arbiter and a plurality of PCI express (PCIe) interface units. The disk array is configured to be electrically connected to a respective one of the plurality of PCIe interface units and store therein the first datum, wherein the first BMC monitors a hardware state of the processing module for performing a remote control, and the Linux program arbiter communicates with the second node device and includes a write protection unit and an unlocking unit. The write protection unit allows a first request for overwriting the first datum from the first node device, and prevents the second datum from being overwritten when receiving the first request. The unlocking unit causes the second node device to unlock the second node device after the first datum is overwritten by a third datum, and the unlocking unit causes the second node device to replace the second datum with the third datum.

In accordance with another embodiment of the present disclosure, a method for maintaining data consistency between a first node device and a second node device in a storage area network (SAN) is provided, wherein the first node device is connected to the second node device to form a node device group, the first node device and the second node device have a first datum and a second datum respectively, the first datum and the second datum have the same content. The method includes the following steps: The first node device is provided with a processing module having a Linux program arbiter, wherein the Linux program arbiter communicates with the second node device and includes a write protection unit and an unlocking unit. A first request is allowed when the write-protection unit receives the first request for overwriting the first datum, and the second node device is caused to prevent the second datum from being overwritten. After the first datum is overwritten by a third datum, the second node device is caused to replace the second datum with the third datum, and then is unlocked.

In accordance with a further embodiment of the present disclosure, a first node device configured to connect a second node device to form a node device group is provided, wherein the first node device and the second node have a first datum and a second datum respectively, the first datum has the same content as the second datum, and the first node device includes a storage device and a server. The server is configured to electrically connect the storage device and has a processor including a Linux program arbiter communicating with the second node device, wherein the Linux program arbiter includes a permitting unit and a write-protection unit. The permitting unit is configured to allow a first request when receiving the first request for overwriting the first datum, and the write-protection unit is configured to prevent the second node device from overwriting the second datum before the first datum is overwritten by a third datum and the second node device replaces the second datum with the third datum.

The above embodiments and advantages of the present invention will become more readily apparent to those ordinarily skilled in the art after reviewing the following detailed descriptions and accompanying drawings:

BRIEF DESCRIPTION OF THE DRAWINGS

FIG. 6A is a schematic diagram showing an arbiter according to a preferred embodiment of the present disclosure;

FIG. 6B is a schematic diagram showing a flow for a plurality of hosts which write data to the node device group according to a preferred embodiment of the present disclosure;

FIG. 7A is a schematic diagram showing another arbiter according to a preferred embodiment of the present disclosure;

FIG. 7B is a schematic diagram showing a flow of writing data to the node device group by the plurality of hosts according to another preferred embodiment of the present disclosure;

FIGS. 8B-1 and 8B-2 are schematic diagrams showing a flow of writing data to a node device group by a plurality of hosts according to another preferred embodiment of the present disclosure;

DETAILED DESCRIPTION OF THE PREFERRED EMBODIMENTS

Please refer to all FIGS. accompanied with the detailed description of the present invention, theses FIGS. showing different embodiments to facilitate the skilled person in the art to understand the features of the present invention. The disclosure provides sufficient embodiments to demonstrate the features of the present invention, each disclosed embodiment does not conflict with the others, and new embodiments can be implemented through an arbitrary combination thereof, i.e., the present invention is not restricted to the embodiments disclosed in the present specification.

Figure 1:
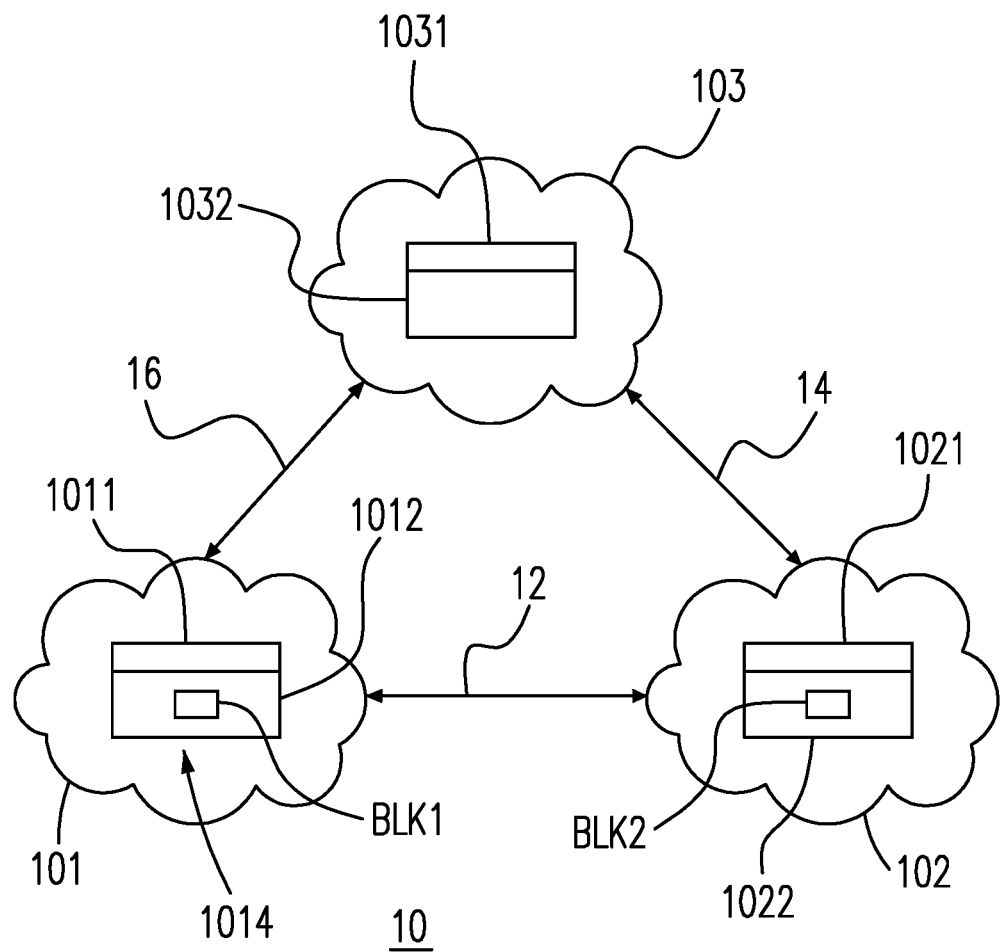
FIG. 1 is a schematic diagram showing a node device group according to a preferred embodiment of the present disclosure.

Please refer to FIG. 1, which is a schematic diagram showing a node device group 10 according to a preferred embodiment of the present disclosure. The node device group 10 includes a first node device 101, a second node device 102, and a third node device 103. The node devices 101, 102 and 103 respectively include servers 1011, 1021 and 1031, and respectively include disk arrays 1012, 1022 and 1032. Each of the node devices 101, 102 and 103 accesses data through the networks 12, 14 and 16. The servers 1011, 1021 and 1031 are, for example, storage area network (SAN) servers. The node device group 10 may be referred to as a node device cluster.

Figure 2:
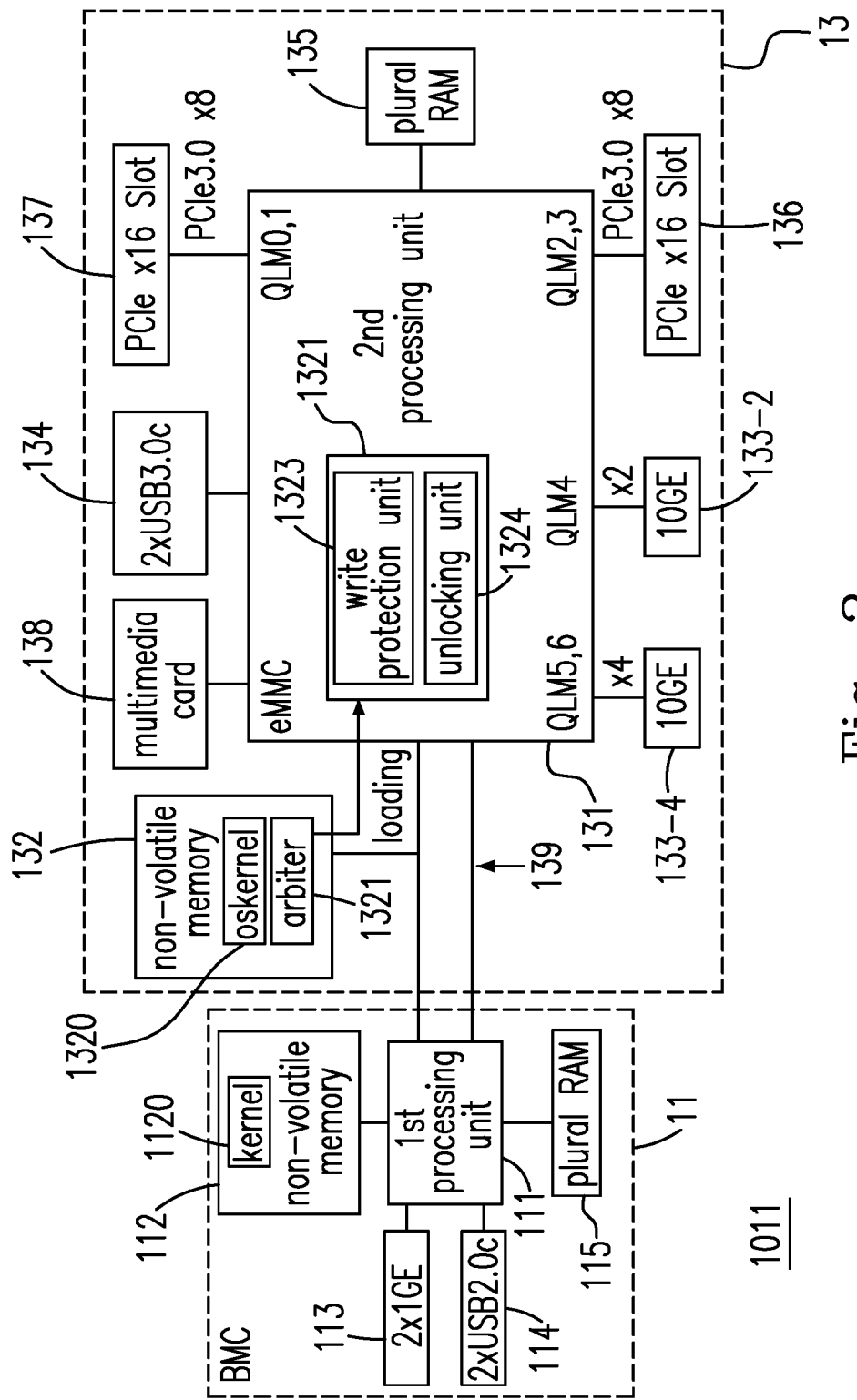
FIG. 2 is a schematic diagram showing the hardware architecture of the servers according to a preferred embodiment of the present disclosure.

Please refer to FIG. 2, which is a schematic diagram showing the hardware architecture of the servers 1011, 1021, and 1031 according to a preferred embodiment of the present disclosure. Please refer to FIGS. 1 and 2, each of the servers 1011, 1021 and 1031 includes a monitoring module 11 and a processing module 13 coupled to the monitoring module 11. The monitoring module 11 may be referred to as a baseboard management controller (BMC). The BMC includes a first processing unit 111, a first non-volatile memory unit 112, a plurality of communication network interface units 113, a plurality of universal serial bus (USB) interface 114 and a plurality of random access memory (RAM) 115. The first processing unit 111 is coupled to the first non-volatile memory unit 112, the plurality of communication network interface units 113, the plurality of USB interface 114 and the plurality of RAM 115. The first non-volatile memory unit 112 stores a first operating system kernel 1120 and is used to load the first operating system kernel 1120 into the first processing unit 111. The plurality of communication network interface units 113 monitor and manage the node device group 10 by communicating with each of the BMCs. The plurality of random access memories 115 can temporarily store data to be synchronized. The USB interface 114 can expand the storage capacity of the BMC, or update the first operating system kernel (or core) 1120 in the first non-volatile memory unit 112 through the USB interface 114. The update of the first operating system core 1120 may also be performed through a network by using one of the ports of the plurality of communication network interface units 113. In a preferred embodiment, the first non-volatile memory unit 112 may be a flash memory, such as an NAND Flash or an NOR Flash, and any of the plural communication network interface units 113 may be a Giga bit Ethernet interface. The first operating system core 1120 may be loaded into the plurality of random access memories 115 to form a RANI DISK, and then the first operating system core 1120 can be loaded into the first processing unit 111 for execution.

In FIG. 2, the processing module 13 includes a second processing unit 131, a second non-volatile memory unit 132, a plurality of electrical network connection interface units 133-4 and 133-2, a plurality of USB interfaces 134, a plurality of RAMs 135, a plurality of PCI express (PCIe) interface units 136 and 137, and an Embedded Multi Media Card (eMMC) 138. The second processing unit 131 can be a mobile device processing component, is applied to the SAN servers 1011, 1021, and 1031, and is coupled to the second non-volatile memory unit 132, the plurality of electrical network connection interface units 133-4 and 133-2, the plurality of USB interfaces 134, the plurality of RANIs 135, the plurality of PCI express (PCIe) interface units 136 and 137, and the eMMC 138. The second non-volatile memory unit 132 stores a second operating system kernel 1320 and is used to load the second system kernel 1320 into the second processing unit 131. The second operating system kernel (or core) 1320 may be an open source operating system, such as a Linux operating system, an Ubuntu operating system, a CentOS operating system, etc., and the architecture on the Linux operating system may be used for at least one of a Linux application and a Linux driver forming an arbiter 1321. The second operating system core 1320 may be loaded into the plurality of random access memories 135 to form a RANI DISK, and then the second operating system core 1320 and the arbiter 1321 may be loaded into the second processing unit 131 for execution. The plurality of electrical network connection interface units 133-4 and 133-2 are electrically connected to the second processing unit 131, wherein the second processing unit 131 can access the data among the disk arrays 1012, 1022 and 1032 through the plurality of electrical network connection interface units 133-4 and 133-2 according to an instruction of the arbiter 1321. The second processing unit 131 may be a mobile processor with high efficiency, low cost, and low power consumption, such as an ARNI processor with 8 to 24 hardware cores (CORE) and 64 bits.

In any one of the embodiments of the present disclosure, the Linux program arbiter 1321 may include a Linux operating system and a Linux driver. The arbiter 1321 is configured to communicate with the second node device 102 to determine whether the second node device 102 can join the node device group 10 and expand at least one of the capacity of the storage device 1014 and redundancy after the second node device 102 joins the node device group 10.

In any one of the embodiments of the present disclosure, the BMC monitors a temperature state of the processing module 13, and can monitor a rotating speed of a fan (not shown) on the processing module 13 according to the temperature state, and the arbiter 1321 is used to turn the processing module on or off, or restart the processing module.

The processing module 13 in FIG. 2 may be the motherboard of the SAN servers 1011, 1021 and 1031. The monitoring module 11 may also be integrated into the motherboard or separated from the processing module 13; and a bus 139 used between integrated circuits (ICs) is disposed between the monitoring module 11 and the processing module 13, and is used to transmit control information and access data. The plural electrical network connection interface units 133-4 and 133-2 can be respectively four Gigabit Ethernet ports and two Gigabit Ethernet ports, and each Gigabit Ethernet port can reach 1 Gigabyte per second data transmission rate, which is equivalent to 8 Gigabits per second. The plurality of PCIe interface units 136 and 137 can be eight high-speed (16 times standard PCIe transfer rate) PCIe interface units, respectively, so that the plurality of PCIe interface units 136 and 137 can be electrically connected to the disk arrays 1012, 1022 and 1032 to connect the interfaces through a plurality of electrical networks units 133-4 and 133-2 in order to access data between the disk arrays 1031, 1032 and 1033 of the node devices 101, 102 and 103. The plurality of PCIe interface units 136 and 137 are different from the network interface of the fiber network, and can be used to greatly reduce costs and achieve good requirements for efficient transmission. Disk arrays 1031, 1032, and 1033 can be solid-state hard disks, which can increase the efficiency of data access compared to mechanical hard disks. In any embodiment of the present disclosure, each of the disk arrays are provided according to at least one selected from a plurality of storage structures/architectures, which includes a block-level storage architecture, a file-level storage architecture and an object-level storage architecture.

Figure 3:
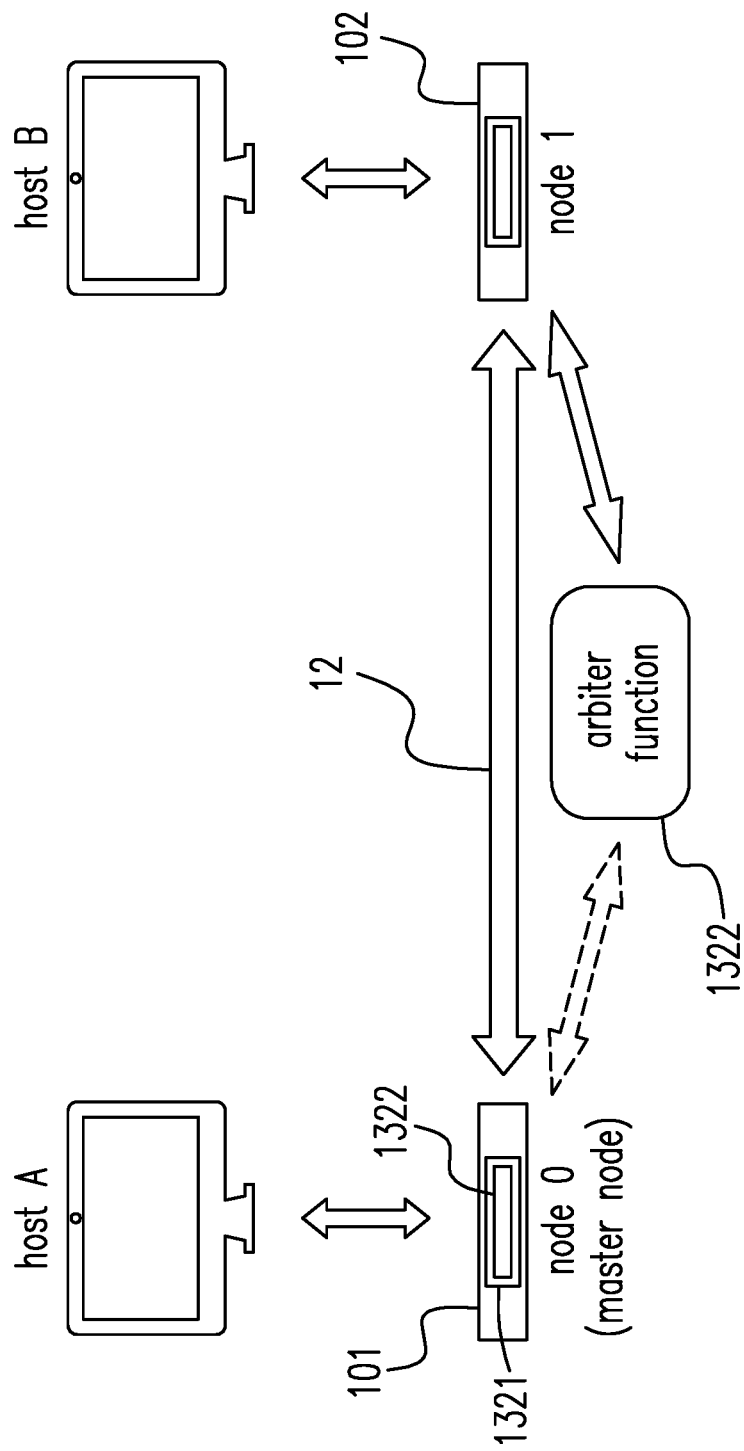
FIG. 3 is a schematic diagram showing a state that a plurality of hosts join a SAN node device group according to a preferred embodiment of the present disclosure.

Please refer to FIG. 3, which is a schematic diagram showing a state that a plurality of hosts join a SAN node device group 10 according to a preferred embodiment of the present disclosure. In a preferred embodiment, a node 0 (i.e., the first node 101) and a node 1 (i.e., the second node 102) have already been members of the SAN node device group 10, and the master node device is the node 0. The host A (or a first host device) and the host B (or a second host device) respectively make requests to the node 0 and the node 1 in order to join the SAN node device group 10. At this time, the arbiter 1321 in the node 0 can execute the arbitration function component 1322. Through the internet 12, the control message of the arbiter 1321 can be transmitted to other nodes. The host A and the host B can be clients or servers.

Figure 4:
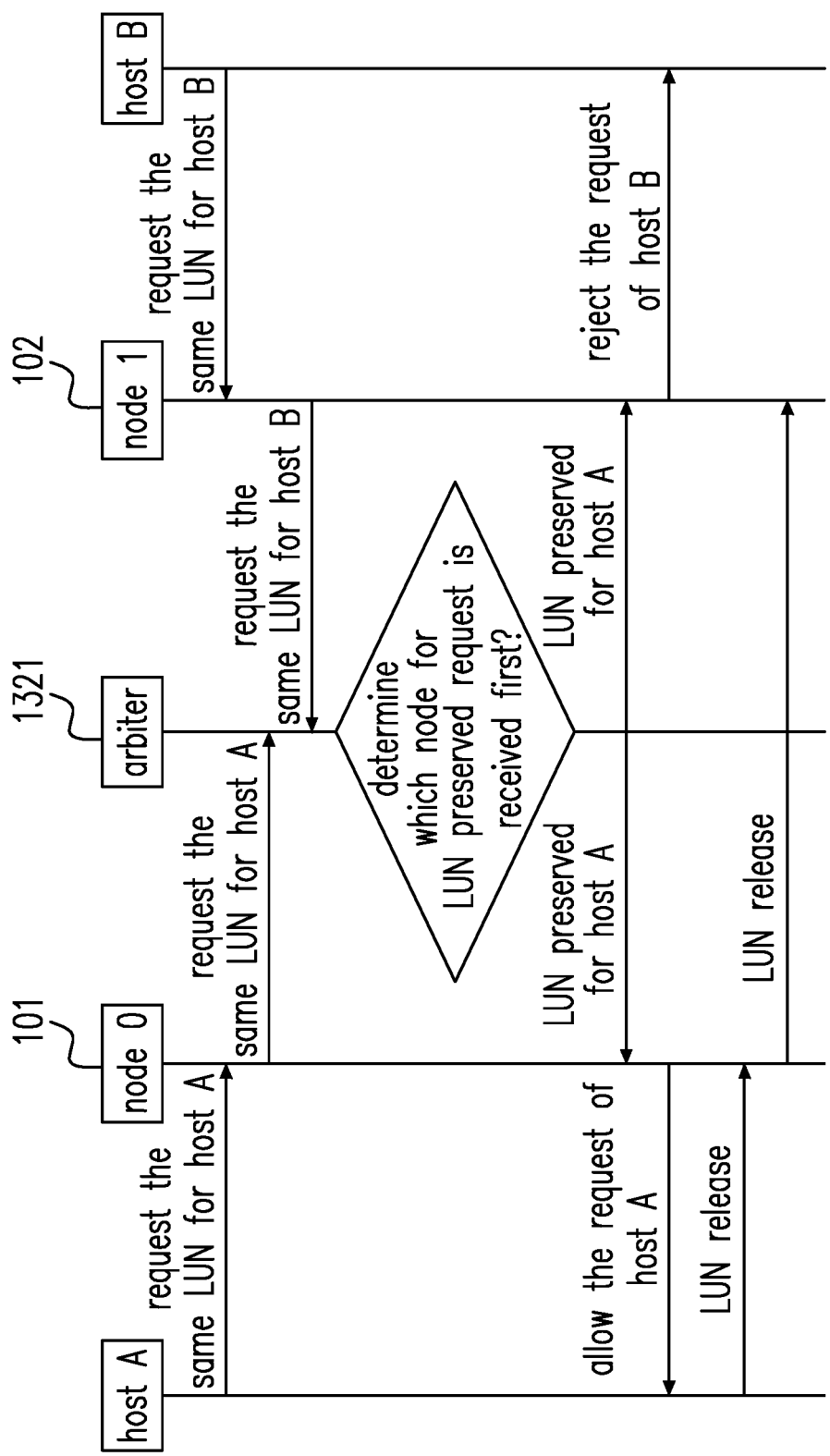
FIG. 4 is a schematic diagram showing a flow formed when a plurality of hosts join a SAN node device group according to a preferred embodiment of the present disclosure.

Please refer to FIG. 4, which is a schematic diagram showing a flow formed when a plurality of hosts join a SAN node device group 10 according to a preferred embodiment of the present disclosure. Please refer to FIGS. 3 and 4. When the first host device (or the host A) and the second host device (or the host B) respectively make requests to the first node device 101 and the second node device 102 in order to reserve the same Logic Unit Number (LUN) to join the node device group 10, the arbiter 1321 notifies the node device that received the request first to allow it to join the node device group 10, and notifies other node devices to refuse to join the node device group 10. In this embodiment, since the host A and the host B make requests for the same LUN and the arbiter 1321 first receives the request from the node 0 for reserving the LUN to the host A, the arbiter 1321 determines to reserve the LUN for the host A, notifies the node 0 and the node 1 to reserve the LUN for the host A; and when the node 1 rejects the request made by the host B, the node 0 allows the request made by the host A. When the first host device 101 which has joined the node device group 10 needs to leave the node device group 10, the first host device 101 sends a release message to other node devices except the first host device 101, for example, the node 1. At this time, the host B can make a request to the node 1 again.

In any one of the embodiments of the present disclosure, when the first host device 101 and the second host device 102 have already had different LUNs, the arbiter 1321 selects the node device with the lowest node number or LUN to serve as the master node device.

In any one of the embodiments of the present disclosure, the arbiter 1321 does not need to determine reservations of other non-LUN types. After the first node device 101 or the second node device 102 receives the non-LUN type reservations, it directly informs other node devices without going through the arbiter 1321.

Figure 5:
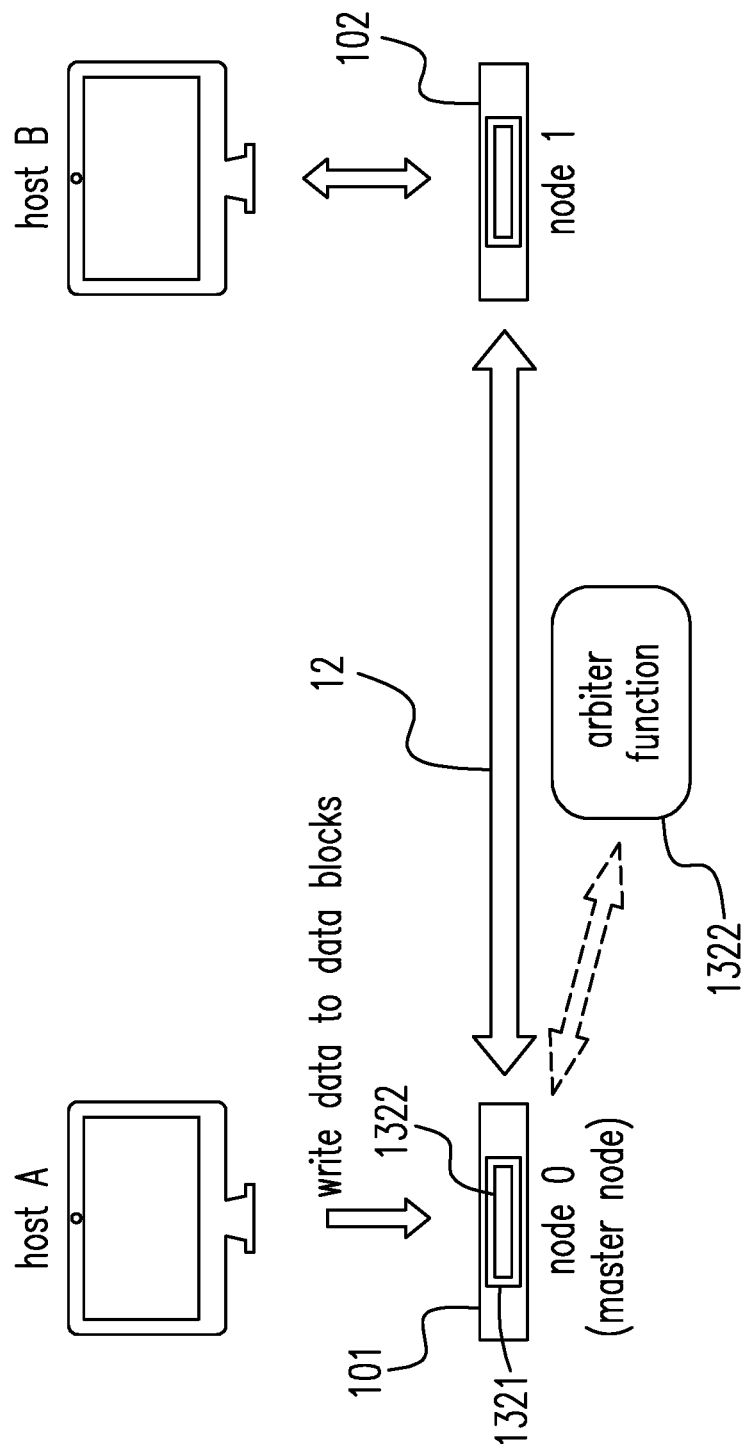
FIG. 5 is a schematic diagram showing a state that a plurality of hosts write data to the node device group according to a preferred embodiment of the present disclosure.

Please refer to FIG. 5, which is a schematic diagram showing a state that a plurality of hosts write data to the node device group 10 according to a preferred embodiment of the present disclosure. In FIG. 5, the node device group 10 includes the first node device 101, the second node device 102, a first host device (or the host A), and a second host device (or the host B), that is, the host A and the host B have joined the node device group 10. In another embodiment, the host A and the host B have not yet joined the node device group 10, or one of them has not joined the node device group 10, and these cases above can be applied to the embodiments described below. In the initial situation, the data blocks of the node 0 and the node 1 are not locked, and the node 0 and the node 1 share a common database, that is, the data of the two nodes has been synchronized.

Please refer to FIG. 6A, which is a schematic diagram showing an arbiter 1321 according to a preferred embodiment of the present disclosure. The arbiter 1321 includes a write-protection unit 1323 and an unlocking unit 1324 coupled to the write-protection unit 1323. Please refer to FIG. 6B, which is a schematic diagram showing a flow for a plurality of hosts which write data to the node device group 10 according to a preferred embodiment of the present disclosure. Please refer to FIGS. 1, 2, 5, 6A and 6B; in a preferred embodiment according to the present disclosure, a first node device 101 is provided for a Storage Area Network (SAN), wherein the first node device 101 is connected to a second node device 102 to form a node device group 10, the first and the second node devices 101 and 102 have a first datum DA1 and a second datum DA2 respectively, and the first and the second data DA1 and DA2 have the same content, and the first node device 101 includes an SAN server 1011 and a disk array 1012. The SAN server 1011 includes a first Baseboard Management Controller (first BMC) 11 and a processing module 13 coupled to the first BMC 11. The processing module 13 includes a Linux program arbiter 1321 and a plurality of PCI express (PCIe) interface units 136 and 137. The disk array 1012 is configured to be electrically connected to a respective one of the plurality of PCIe interface units 136 and 137, and stores therein the first datum DA1, wherein the first BMC 11 monitors a hardware state of the processing module 13 for performing a remote control. The Linux program arbiter 1321 communicates with the second node device 102, and includes a write protection unit 1323 and an unlocking unit 1324. The write protection unit 1323 allows a first request for overwriting the first datum DA1 from the first node device 101, and prevents the second datum DA2 from being overwritten when receiving the first request. The unlocking unit 1324 causes the second node device 102 to unlock the second node device 102 after the first datum DA1 is overwritten by a third datum DA3, and the unlocking unit 1324 causes the second node device 102 to replace the second datum DA2 with the third datum DA3.

Accordingly, when the second datum DA2 in the node 1 is replaced with the third datum DA3, the datum DA3 of the node 0 has been synchronized to that of the node 1. Thus, the data blocks of the original datum DA2 can be overwritten by a fourth datum DA4 through the host B. That is, the write protection unit 1323 allows the second request, an automatic synchronization is complete in the SAN node device group 10 based on the open source OS, and prevents from data inconsistencies.

Please refer to FIGS. 1, 2, 5, 6A and 6B; in another preferred embodiment, a first node device 101 is shown therein, and is connected to a second node device 102 to form a node device group 10. The first node device 10 and the second node device 102 respectively have a first datum DA1 and a second datum DA2; the first datum DA1 has the same content as the second datum DA2; and the first node device 101 includes a storage device 1014 and a server 1011. The server 1011 is electrically connected to the storage device 1014, and has a processor 131. The processor 131 includes a Linux program arbiter 1321 communicating with the second node device 102; and the Linux program arbiter 1321 includes a write-protection unit 1323 and an unlocking unit 1324. When the write-protection unit 1323 receives a first request for overwriting the first datum DA1, the first request is allowed to make the second node device 102 prevent the second datum DA2 from being overwritten. The unlocking unit 1324 unlocks the second node device 102 after the first datum DA1 is overwritten by a third datum DA3 and the second node device 102 replaces the second datum DA2 with the third datum DA3.

Please refer to FIG. 7A, which is a schematic diagram showing another arbiter 1321 according to a preferred embodiment of the present disclosure. The arbiter 1321 includes a write-protection unit 1323 and a permitting unit 1325 coupled to the write-protection unit 1323. Please refer to FIG. 7B, which is a schematic diagram showing a flow of writing data to the node device group 10 by the plurality of hosts according to another preferred embodiment of the present disclosure. Please refer to FIGS. 1, 2, 5, 7A and 7B, in a preferred embodiment, a first node device 101 is disclosed therein. The first node device 101 is connected to a second node device 102 to form a node device group 10, wherein the first node device 101 and the second node device 102 have a first datum DA1 and a second datum DA2 respectively, and the first datum DA1 has the same content as the second datum DA2. The first node device 101 includes a storage device 1014 and a server 1011. The server 1011 is electrically connected to the storage device 1014, and has a processor 131, wherein the processor 131 includes a Linux program arbiter 1321 communicating with the second node device 102, and the Linux program arbiter 1321 includes a permitting unit 1325 and a write-protection unit 1323. When the permitting unit 1325 receives a first request for overwriting the first datum DA1, the permitting unit 1325 allows the first request. The write-protection unit 1323 causes the second node 102 to prevent the first datum DA1 from being overwritten by a third datum DA3 before the second node device 102 replaces the second datum DA2 with the third data DA3.

Accordingly, when the second datum DA2 in the node 1 is replaced with the third datum DA3, the datum of the node 0 has been synchronized to that of the node 1, so the data block of the original second datum DA2 can be overwritten by a fourth datum DA4 through the host B. That is, the write-protection unit 1323 allows the second request to complete automatic data synchronization in the SAN node device group 10 based on the open source operating system, and avoids data inconsistency.

Figure 8A:
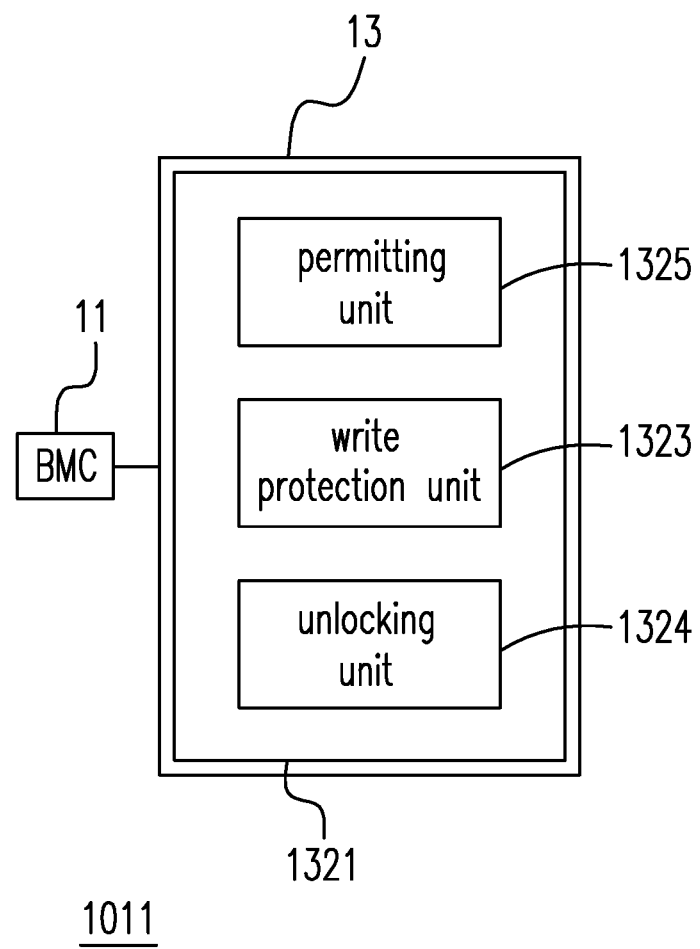
FIG. 8A is a schematic diagram showing another arbiter according to a preferred embodiment of the present disclosure.
Figures 1, 8B:
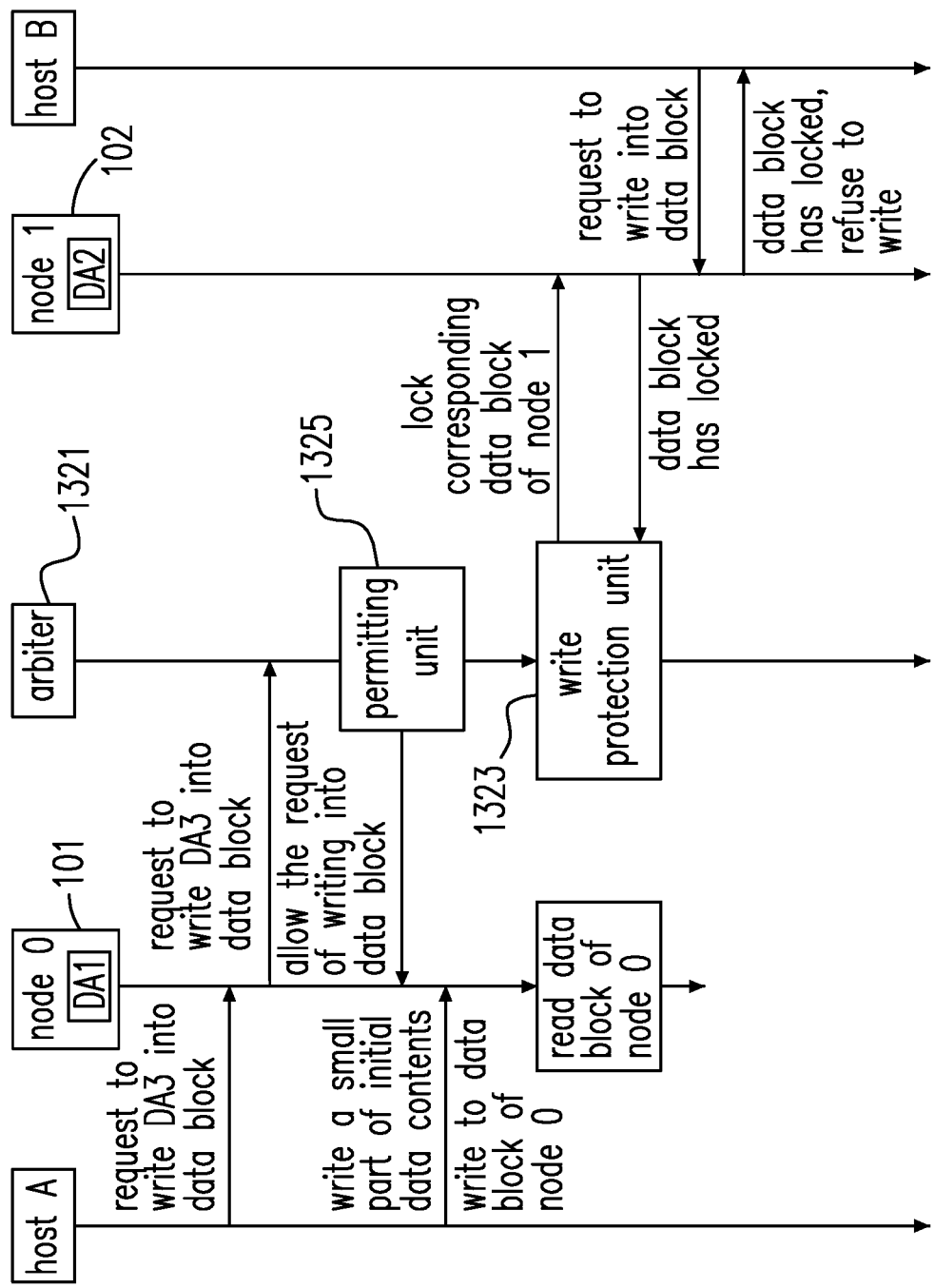
Figures 2, 8B:
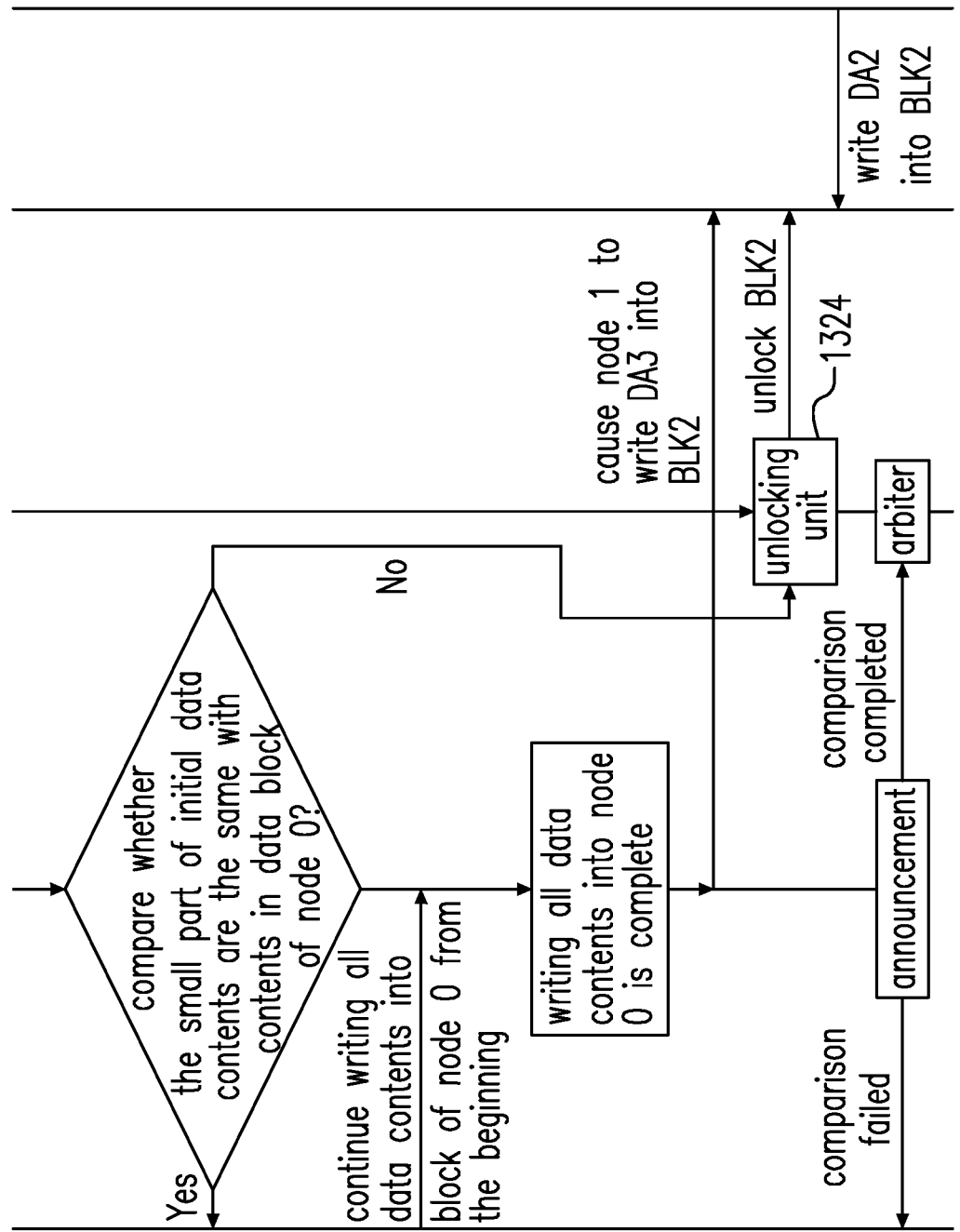

Please refer to FIG. 8A, which is a schematic diagram showing another arbiter 1321 according to a preferred embodiment of the present disclosure. The arbiter 1321 may also include the permitting unit 1325, the write-protection unit 1323 coupled to the permitting unit 1325, and the unlocking unit 1324 coupled to the write-protection unit 1323. Please refer to FIGS. 8B-1 and 8B-2, which are schematic diagrams showing a flow of writing data to a node device group 10 by a plurality of hosts according to another preferred embodiment of the present disclosure. As shown in FIGS. 1, 2, 4, 8A and 8B, the first node device 101 and the second node device 102 are mirror nodes for each other. The first node device 101 includes a first disk array 1012 having a first predetermined write blocks BLK1; and the second node device 102 includes a second disk array 1022 having a second predetermined write blocks BLK2. The two disk arrays 1012 and 1022 are redundant disk arrays, and the data blocks in the two disk arrays 1012 and 1022 have a corresponding synchronization relationship. Initially, the host A requests the node 0 to write a third datum DA3 to the datum block (for example, the first predetermined write block BLK1 of the first disk array 1012), and the node 0 notifies the arbiter 1321 that the host A request to write to a datum block of the disk array 1012 of the node 0. The permitting unit 1325 in the arbiter 1321 allows the request to write the third datum DA3, and the write-protection unit 1323 causes the node 1 to lock the corresponding datum block in the node 1 (for example, the second predetermined write block BLK2 of the second disk array 1022).

After the node 1 responds to the write-protection unit 1323 of the arbiter 1321 that the second predetermined write block BLK2 has been locked, the node 0 starts reading the third datum DA3 which is written to the first predetermined write block BLK1. The host A can first write a small part of the initial data content to the data block of the node 0, such as 512 Bytes of data, and then the node 0 compares the small part of the initial data content with the content of the data blocks of the node 0, to determine whether they are the same or not. If yes, the host A continues to write all data contents from the beginning (or from its subsequent data) to the data blocks of the node 0. In one embodiment, data of 512*n bytes is written, where n=2, that is, the first data of 512 bytes is used for comparison, and the later data of 512 bytes is actually written. When the host B requests the node 1 to write a fourth datum DA4 to the second predetermined write block BLK2 of the second disk array 1022, the second predetermined write block BLK2 has been locked, so that the fourth datum DA4 cannot be written for the time being. Under the condition that the node 0 finishes reading the third datum DA3 of the first predetermined write block BLK1, the arbiter 1321 compares the first datum DA1 with the third datum DA3 to obtain a result. When the result is positive, the arbiter 1321 allows the host A to continue writing subsequent data to the first disk array BLK1. After the completion of writing all the necessary content to the node 0 and the arbiter 1321 causes the node 1 to use the third datum DA3 to write to the second predetermined block BLK2, the unlocking unit 1324 notifies the node 1 to unlock the second predetermined write block BLK2.

Accordingly, if the content of the initial data of the small part is different from the contents on the data blocks of the node 0, the result is negative, then the node 0 notifies the unlocking unit 1324 to notify the node 1 to unlock the second predetermined write block BLK2, such that the fourth datum DA4 is written into the second predetermined write block BLK2. The node 0 notifies the arbiter 1321 that the comparison has been completed, notifies the host A that the data comparison fails, and stops writing the third datum DA3 and the subsequent/datum/data. The arbiter 1321 in the present disclosure can automatically maintain the consistency of the datum/data in the disk arrays 1012, 1022 and 1032.

In any one of the embodiments of the present disclosure, if the result is negative, the node 0 can directly notify the node 1 to unlock without going through the unlocking unit 1324.

In any one of the embodiments of the present disclosure, during the period when the first host device (or the host A) writes the third datum DA3 into the N blocks of a certain logical unit (Logic Unit, LU) of the first node device 101, and when the second host device (or the host B) reads the third datum DA3 from the N blocks of the same logical unit of the second node device 102, the second host device (or the host B) may read an error. However, in any one of embodiments of the present disclosures, the method of maintaining data consistency in the node device group can avoid this situation. The two node devices 101 and 102 can mirror each other and can synchronize data in different directions. The arbiter 1321 regards the two nodes as the node devices 101 and 102 having the same LUN.

Figure 9:
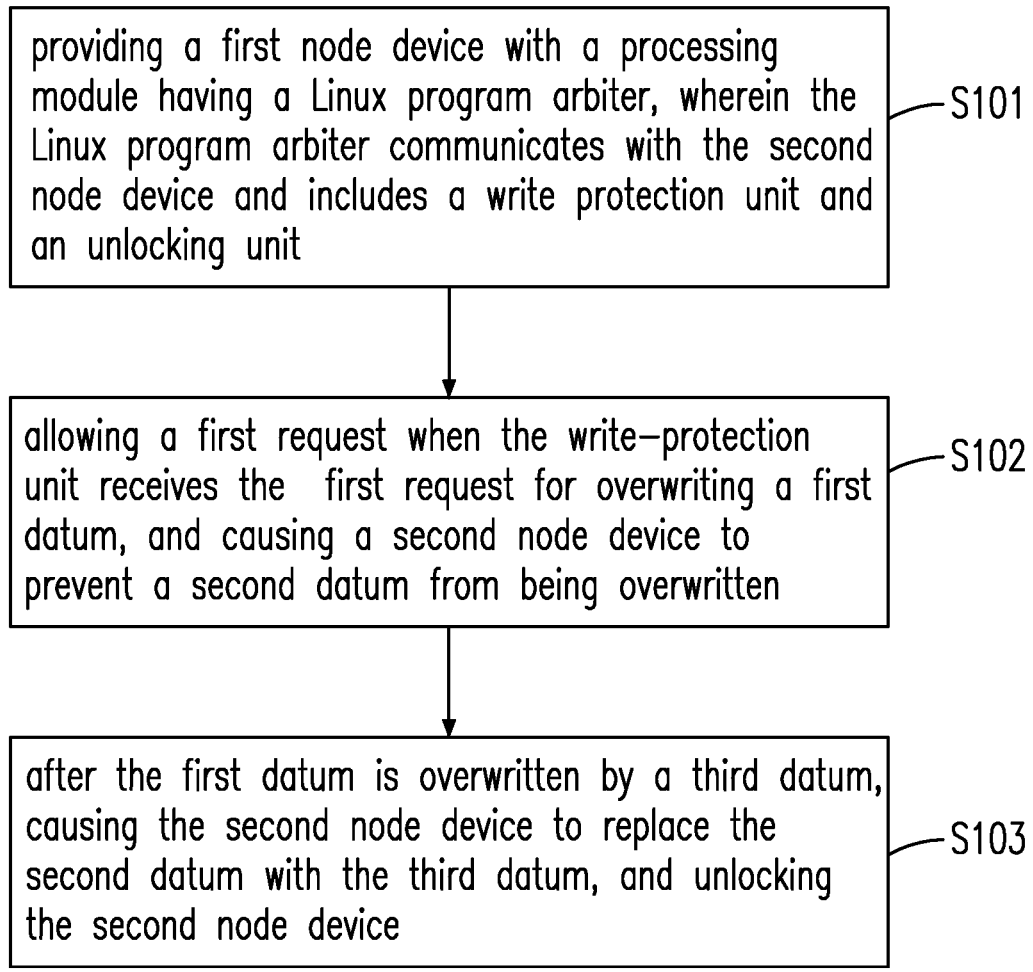
FIG. 9 is a schematic diagram showing a method for maintaining a data consistency of a first node device 101 of a storage area network (SAN) in a preferred embodiment of the present disclosure.

Please refer to FIG. 9, which is a schematic diagram showing a method S10 for maintaining a data consistency of a first node device 101 of a storage area network (SAN) in a preferred embodiment of the present disclosure. The node device 101 is connected to a second node device 102 to form a node device group 10. The first node device 101 and the second node device 101 have a first datum DA1 and a second datum DA2, respectively. The first datum DA1 and the second datum DA2 have the same content, and the method S10 includes the following steps of: Step S101: providing the first node device 101 with a processing module 13 having a Linux program arbiter 1321, wherein the Linux program arbiter 1321 communicates with the second node device 102, and includes a write protection unit 1323 and an unlocking unit 1324. Step S102: allowing a first request when the write-protection unit 1323 receives the first request for overwriting the first datum DA1, and causing the second node device 102 to prevent the second datum DA2 from being overwritten. Step S103: after the first datum DA1 is overwritten by a third datum DA3, causing the second node device 102 to replace the second datum DA2 with the third datum DA3, and unlocking the second node device 102.

In any one embodiment of the present disclosure, when the first node device 101 and the second node device 102 cannot communicate with each other, the arbiter 1321 is used to perform the following steps of: stopping the node device group 10 from operating when the first node device 101 having the Linux program arbiter 1321 is shut down or isolated; and causing the second node device 102 to shut down to avoid the inconsistency of the first or third data DA1 or DA3 while allowing the other node device (for example, node device 103) in the node device group 10 to continue to operate.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A first node device for a Storage Area Network (SAN), wherein the first node device is connected to a second node device to form a node device group, the first and the second node devices have a first datum and a second datum respectively, and the first and the second data have the same content, and the first node device comprises:
    an SAN server including:
        a first Baseboard Management Controller (first BMC); and
        a processing module including a Linux program arbiter and a plurality of PCI express (PCIe) interface units; and
    a disk array configured to be electrically connected to a respective one of the plurality of PCIe interface units and store therein the first datum, wherein:
        the first BMC monitors a hardware state of the processing module for performing a remote control; and
        the Linux program arbiter communicates with the second node device and includes:
            a write protection unit allowing a first request for overwriting the first datum from the first node device, and preventing the second datum from being overwritten when receiving the first request; and
            an unlocking unit causing the second node device to unlock the second node device after the first datum is overwritten by a third datum and the unlocking unit causes the second node device to replace the second datum with the third datum.

2. The first node device as claimed in claim 1, wherein:
    the Linux program arbiter includes a Linux operating system and a Linux driver; and
    the Linux program arbiter communicates with the second node device, and determines whether the second node device can join the node device group to expand at least one of a capacity and a redundancy of the disk array.

3. The first node device as claimed in claim 1, wherein:
    the first BMC monitors a temperature state of the processing module, and uses the Linux program arbiter to power on/off or restart the processing module;
    the second node device includes a second BMC; and
    the first BMC further includes:
        a first processing unit;
        a first non-volatile memory unit storing a first operating system kernel and loading the first operating system kernel into the first processing unit; and
        a plurality of communication network interface units monitoring and managing the node device group by communicating the first BMC with the second BMC.

4. The first node device as claimed in claim 1, wherein the processing module includes:
    a second processing unit being a mobile device processing member, and applied to the SAN server; and
    a second non-volatile memory unit configured to store a second operating system kernel and load the second operating system kernel into the second processing unit.

5. The first node device as claimed in claim 1, wherein:
    the node device group is a node device cluster; and
    the disk array includes at least one of a block-level, a file-level and an object-level storage architectures.

6. The first node device as claimed in claim 1, wherein:
    the node device group includes the first node device, the second node device, a first host device and a second host device; and
    when the first and second host devices respectively request the first and second node devices to reserve a specific logical unit number (LUN) for joining the node device group simultaneously, the Linux program arbiter notifies a specific one of the first and second node devices from which the Linux program arbiter receives the request first, and allows the specific node device to join the node device group, but refuses the other node device to join the node device group.

7. The first node device as claimed in claim 6, wherein:
    when the first host device and the second host device have different LUNs, the Linux program arbiter selects the node device having a lower node number as a master node device; and
    when the first host device needs to leave the node device group, the first host device sends a release message to the second node device.

8. The first node device as claimed in claim 1, wherein when a specific node device receives and determines a request for reservation of a non-logical unit number (non-LUN) type from a specific host device, the specific node device informs the other node devices of such reservation request of the non-LUN type.

9. The first node device as claimed in claim 1, wherein:
    the node device group includes the first and the second node devices, a first host device and a second host device; and
    the first node device includes a first disk array having a first predetermined write block, and the second node device includes a second disk array having a second predetermined write block, wherein the first and the second disk arrays are redundant disk arrays with each other.

10. The first node device as claimed in claim 9, wherein:
the Linux program arbiter further includes a permitting unit;
when the first host device requests the first node device to write the third datum into the first predetermined write block of the first disk array, the permitting unit allows the third datum to be written, and the write protection unit causes the second node device to lock the second predetermined write block of the second disk array;
after the second node device responds to the Linux program arbiter that the second predetermined write block has been locked, the first node device starts to obtain a fifth datum by reading the third datum which is written in the first predetermined write block;
when the second host device requests the second node device to write a fourth datum to the second predetermined write block of the second disk array, the second predetermined write block has been locked so that the fourth datum cannot be written temporarily;
under a condition that the Linux program arbiter finishes reading the third datum of the first predetermined write block, the Linux program arbiter compares whether the fifth datum and the third datum are the same to obtain a result; and
when the result is affirmative, the Linux program arbiter allows the first host device to continue writing subsequent data to the first disk array; and
after the subsequent data are written and the Linux program arbiter causes the second node device to write the third datum into the second predetermined write block, the unlocking unit notifies the second node device to unlock the second predetermined write block, the Linux program arbiter notifies the first host device that a data comparison and a data writing have been completed, and the second predetermined write block is a redundant write block related to the first predetermined write block.

11. The first node device as claimed in claim 10, wherein:
when the result is negative, the unlocking unit notifies the second node device to unlock the second predetermined write block so that the fourth datum is written into the second predetermined write block;
the first node device notifies the Linux program arbiter that the data comparison has been completed, and notifies the first host device that there is a failing data comparison, to stop writing the subsequent data; and
the Linux program arbiter is configured to maintain a data consistency among the disk arrays.

12. A method for maintaining data consistency between a first node device and a second node device in a storage area network (SAN), wherein the first node device is connected to the second node device to form a node device group, the first node device and the second node device have a first datum and a second datum respectively, the first datum and the second datum have a same content, and the method includes the following steps of:
providing the first node device with a processing module having a Linux program arbiter, wherein the Linux program arbiter communicates with the second node device and includes a write protection unit and an unlocking unit;
allowing a first request when the write protection unit receives the first request for overwriting the first datum, and causing the second node device to prevent the second datum from being overwritten; and
after the first datum is overwritten by a third datum, causing the second node device to replace the second datum with the third datum, and unlocking the second node device.

13. The method as claimed in claim 12, wherein:
the first node device includes a SAN server and a disk array electrically connected to the SAN server, wherein the disk array stores the first datum;
the Linux program arbiter includes a Linux operating system and a Linux driver;
the node device group is a node device cluster;
the first node device has the Linux program arbiter; and
the method further includes a step of requesting from a first host device to join the node device group, wherein the requesting step includes the following substeps:
using the Linux program arbiter to notify a specific node device from which the Linux program arbiter first received a new request in order to allow the specific node device including the first host device to join the node device group, and to refuse all other node devices to join the node device group when the first host device and at least one other host device in all the other node devices request the respective node devices thereof to reserve a specific Logic Unit Number (LUN) for joining the node device group simultaneously; and
using the Linux program arbiter to select the node device having a lower LUN as a master node device when the first host device and the at least one other host device have different LUNs.

14. The method as claimed in claim 13, wherein:
when the first host device needs to leave the node device group, the first host device sends a release message to the other node devices; and
when a specific node device receives and determines a request for reservation of a non-logical unit number (LUN) type from a specific host device, the specific node device informs other node devices of such reservation request of the non-LUN type.

15. The method as claimed in claim 13, wherein:
the node device group includes the first and the second node devices, a first host device and a second host device; and
the first node device includes a first disk array having a first predetermined write block, and the second node device includes a second disk array having a second predetermined write block, wherein the first and the second disk arrays are redundant disk arrays with each other;
the method further includes the following steps of:
when the first host device requests the first node device to write the third datum into the first predetermined write block of the first disk array, the permitting unit allows the third datum to be written, and the write protection unit causes the second node device to lock the second predetermined write block of the second disk array;
after the second node device responds to the Linux program arbiter that the second predetermined write block has been locked, the first node device starts to obtain a fifth datum by reading the third datum which is written in the first predetermined write block;
when the second host device requests the second node device to write a fourth datum to the second predetermined write block of the second disk array, the second predetermined write block has been locked so that the fourth datum cannot be written temporarily;

under a condition that the Linux program arbiter finishes reading the third datum of the first predetermined write block, the Linux program arbiter compares whether the fifth datum and the third datum are the same to obtain a result;

when the result is affirmative, the Linux program arbiter allows the first host device to continue writing subsequent data to the first disk array;

after the subsequent data are written and the Linux program arbiter causes the second node device to write the third datum into the second predetermined write block, the unlocking unit notifies the second node device to unlock the second predetermined write block, the Linux program arbiter notifies the first host device that a data comparison and a data writing have been completed, and the second predetermined write block is a redundant write block related to the first predetermined write block;

when the result is negative, the unlocking unit notifies the second node device to unlock the second predetermined write block so that the fourth datum is written into the second predetermined write block;

the first node device notifies the Linux program arbiter that the data comparison has been completed, and notifies the first host device that there is a failing data comparison, to stop writing the subsequent data; and the Linux program arbiter is configured to maintain a data consistency among the disk arrays.

16. The method as claimed in claim 12, wherein:

during a period that a first host device is writing a third datum into a block N of a specific logical unit (LU) of the first node device, when a second host device tries to read the first or third datum from the block N of the specific logic unit of the second node device, the second host device reads an error;

when the first and the second node devices cannot communicate with each other, the Linux program arbiter is configured to perform one of the following steps:

stopping the node device group from operating when the first node device having the Linux program arbiter is shut down or isolated; and causing the second node device to shut down to avoid the inconsistency of the first or third datum while allowing the other node device in the node device group to continue to operate.

17. A first node device configured to connect a second node device to form a node device group, wherein the first node device and the second node device have a first datum and a second datum respectively, the first datum has the same content as the second datum, and the first node device comprises:

a storage device; and a server configured to electrically connect the storage device and having a processor including a Linux program arbiter communicating with the second node device, wherein the Linux program arbiter includes:

a permitting unit configured to allow a first request when receiving the first request for overwriting the first datum; and a write-protection unit configured to prevent the second node device from overwriting the second datum before the first datum is overwritten by a third datum and the second node device replaces the second datum with the third datum.

18. The first node device as claimed in claim 17, wherein:

the node device group includes the first and the second node devices, a first host device and a second host device; and the first node device includes a first disk array having a first predetermined write block, and the second node device includes a second disk array having a second predetermined write block, wherein the first and the second disk arrays are redundant disk arrays with each other;

when the first host device requests the first node device to write the third datum into the first predetermined write block of the first disk array, the permitting unit allows the third datum to be written, and the write-protection unit causes the second node device to lock the second predetermined write block of the second disk array;

after the second node device responds to the Linux program arbiter that the second predetermined write block has been locked, the first node device starts to obtain a fifth datum by reading the third datum which is written into the first predetermined write block;

when the second host device requests the second node device to write a fourth datum to the second predetermined write block of the second disk array, the second predetermined write block has been locked so that the fourth datum cannot be written temporarily;

under a condition that the Linux program arbiter finishes reading the third datum of the first predetermined write block, the Linux program arbiter compares whether the fifth datum and the third datum are the same to obtain a result; and when the result is affirmative, the Linux program arbiter allows the first host device to continue writing subsequent data to the first disk array; and after the subsequent data are written and the Linux program arbiter causes the second node device to write the third datum into the second predetermined write block, the unlocking unit notifies the second node device to unlock the second predetermined write block, the Linux program arbiter notifies the first host device that a data comparison and a data writing have been completed, and the second predetermined write block is now a redundant write block related to the first predetermined write block.

19. The first node device as claimed in claim 18, wherein:

the Linux program arbiter further includes an unlocking unit;

when the result is negative, the unlocking unit notifies the second node device to unlock the second predetermined write block so that the fourth datum is written into the second predetermined write block;

the first node device notifies the Linux program arbiter that the data comparison has been completed, and notifies the first host device that there is a failing data comparison, to stop writing the subsequent data; and the Linux program arbiter is configured to maintain a data consistency among the disk arrays.

20. The first node device as claimed in claim 17, wherein:

the server including:

a first Baseboard Management Controller (first BMC); and a processing module including a Linux program arbiter and a plurality of PCI express (PCIe) interface units;

the storage devise includes a disk array configured to be electrically connected to a respective one of the plurality of PCIe interface units and store therein the first datum, wherein:

the first BMC monitors a hardware state of the processing module for performing a remote control;
the Linux program arbiter further includes an unlocking unit;
the unlocking unit causes the second node device to unlock the second datum after the first datum is overwritten by a third datum and the unlocking unit causes the second node device to replace the second datum with the third datum;
the Linux program arbiter includes a Linux operating system and a Linux driver;
the Linux program arbiter communicates with the second node device, and determines whether the second node device can join the node device group to expand at least one of a capacity and a redundancy of the disk array;
the first BMC monitors a temperature state of the processing module, and uses the Linux program arbiter to power on/off or restart the processing module;
the second node device includes a second BMC;
the first BMC further includes:
  a first processing unit;
  a first non-volatile memory unit storing a first operating system kernel and loading the first operating system kernel into the first processing unit; and
  a plurality of communication network interface units monitoring and managing the node device group by communicating the first BMC with the second BMC;
the processing module includes:
  a second processing unit being a mobile device processing member, and applied to the server; and
  a second non-volatile memory unit storing a second operating system kernel, and loading the second operating system kernel into the second processing unit;
the node device group is a node device cluster; and
the disk array includes at least one of a block-level, a file-level and an object-level storage architectures.

* * * * *